INVENTOR
GEORGE M. BERKIN
BY Francis V. Giolma
ATTORNEY

Aug. 23, 1966 G. M. BERKIN 3,268,865

CHARACTER RECOGNITION SYSTEM EMPLOYING RECOGNITION CIRCUIT DEACTIVATION

Filed Dec. 18, 1963 11 Sheets-Sheet 3

Aug. 23, 1966 G. M. BERKIN 3,268,865

CHARACTER RECOGNITION SYSTEM EMPLOYING
RECOGNITION CIRCUIT DEACTIVATION

Filed Dec. 18, 1963 11 Sheets-Sheet 4

Aug. 23, 1966 G. M. BERKIN 3,268,865

CHARACTER RECOGNITION SYSTEM EMPLOYING RECOGNITION CIRCUIT DEACTIVATION

Filed Dec. 18, 1963 11 Sheets-Sheet 9

| | |
|---|---|
| G0 | |
| G1 | |
| G2 | 1 4 7 A B D |
| G3 | 1 2 3 4 5 6 7 8 C A B D |
| G4 | 0 1 2 3 4 5 6 7 8 C A B D |
| G5 | 0 2 5 8 C |
| G6 | 0 2 5 9 C |
| G7 | 0 2 5 9 C |
| F0 | D |
| F1 | 0 D |
| F2 | 0 1 4 6 7 A D |
| F3 | 0 1 2 4 5 6 7 A B |
| F4 | 0 1 2 4 5 6 7 C A B |
| F5 | 0 2 5 9 C |
| F6 | 0 2 3 5 8 9 C |
| F7 | 0 3 8 9 C |
| E0 | A |
| E1 | 0 4 A |
| E2 | 0 4 9 C A D |
| E3 | 0 2 3 5 6 8 9 C A B D |
| E4 | 0 2 3 5 6 7 8 9 C B D |
| E5 | 2 3 5 6 7 8 9 C |
| E6 | 1 2 3 5 6 7 8 9 C |
| E7 | 1 3 6 7 C |
| D0 | C B |
| D1 | 0 4 7 C B |
| D2 | 0 1 4 7 9 C D |
| D3 | 0 1 2 3 5 6 7 8 9 A D |
| D4 | 0 1 2 3 5 6 7 8 9 A D |
| D5 | 1 2 3 5 6 8 |
| D6 | 1 2 3 5 6 8 |
| D7 | 1 2 |
| C0 | 1 2 3 C A D |
| C1 | 0 1 2 3 7 C A D |
| C2 | 0 3 7 8 9 C |
| C3 | 0 2 3 5 6 7 8 9 A |
| C4 | 0 3 4 5 6 8 9 B |
| C5 | 3 4 5 6 8 B |
| C6 | 3 4 5 6 8 B |
| C7 | 4 5 |
| B0 | 1 2 3 5 7 B |
| B1 | 0 1 2 3 5 7 B |
| B2 | 0 9 A B D |
| B3 | 0 4 9 A B D |
| B4 | 0 4 6 9 C A D |
| B5 | 4 6 9 C |
| B6 | 4 6 8 C |
| B7 | 4 6 8 |
| A0 | 1 2 3 4 5 6 7 9 C A B D |
| A1 | 1 2 3 4 5 6 7 9 C A B D |
| A2 | 8 C A B D |
| A3 | 8 C A B D |
| A4 | 0 8 C A B D |
| A5 | 0 8 C A B D |
| A6 | 0 C A B D |
| A7 | 0 |
FIG. 8
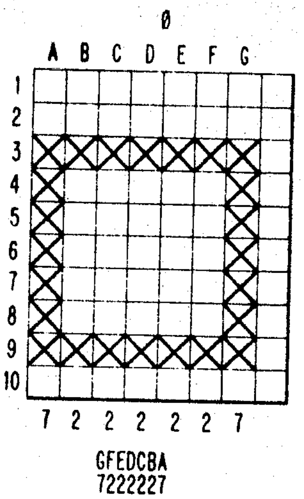
FIG. 9
FIG. 10
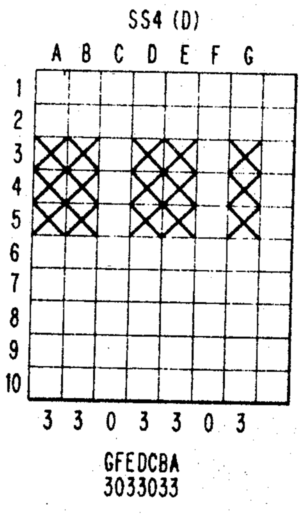

United States Patent Office 3,268,865

Patented August 23, 1966

3,268,865

CHARACTER RECOGNITION SYSTEM EMPLOYING RECOGNITION CIRCUIT DEACTIVATION

George M. Berkin, Muiderberg, Netherlands, assignor to International Business Machines Corporation, New York, N.Y., a corporation of New York Filed Dec. 18, 1963, Ser. No. 331,563
10 Claims. (Cl. 340—146.3)

The present invention relates generally to the character recognition art and more particularly to an improved and highly simplified system for automatically recognizing and providing output signals corresponding to and representative of human language symbols or characters.

Systems have previously been developed and are in widespread use today for reading and recognizing human language symbols or characters, printed or otherwise formed on documents. For example, in the 1210 and 1219 magnetic character reader-sorters, which are manufactured by International Business Machines Corporation, 590 Madison Avenue, New York, New York, documents having characters printed thereon in magnetic ink are transported past a writing station and reading station. At the writing station, the magnetic ink forming the characters is magnetized and at the reading station, the characters are scanned by a plurality of magnetic to electrical transducers or read heads. The read heads are arranged in aligned relation transversely to the direction of character movement. The electrical signals from the transducers are digitized and supplied to a two dimensional shift register which is formed by rows and columns of shift register units. Each of the columns corresponds to a zone or incremental character area which extends transversely across the character. The electrical signals coming from the read heads corresponding to each of the zones are gated into the proper columns of the matrix. Recognition logic statements are interconnected to various shift register units of the two dimensional storage matrix. The electrical representation of a character stored in the storage matrix is shifted in the row direction, and if one of the recognition logic statements is satisfied, an output signal corresponding to and representative of the scanned character is provided. Machines of this type have been employed for several years for automatically reading magnetic characters printed on checks and sorting the checks in accordance with the read information.

In many of the applications of character recognition systems, one of the primary requirements is that the characters be read and recognized with a high degree of accuracy. For example, if checks are being read and the amounts debited against account numbers on the basis of the account number read, erroneous recognition of one or more digits of an account number may result in the amount being debited against the wrong account. Accordingly, it is the aim to optimize the recognition means with a view to minimizing the number of reading errors. However, many of the conditions which contribute to the failure of character readers to correctly recognize characters, particularly those which relate to variations in the printed quality of the characters on the documents, are not under the control of the machine designer.

Accordingly, in accordance with a preferred embodiment of the present invention, characters printed in magnetic ink on checks or the like are scanned by a plurality of magnetic read heads each scanning a different one of a plurality of channels across the characters. Timing means are used to effect a scan of each character at a particular time interval in each of a plurality of successive time zones across the character. The outputs of the read heads are quantized and are scanned and fed to a summing circuit during each time interval to ascertain the total number of black portions recorded during the scan in each time zone.

A character recognition register is provided having a latch for each character. These latches are initially all turned on, and the summing circuit is sampled at a selected time during each time zone in the scanning operation. The outputs of the summing circuit are applied to logic or truth statements circuits arranged in accordance with precalculated probability tables to exclude all but selected characters by turning off all but selected latches at each of these times, depending on the black count for the particular zone. Each time more characters are excluded from being the possible one, and by the time the summing circuit is sampled for the last time zone, or before, only one last character latch will remain on, resulting in recognition of the character being scanned as that character.

One of the objects of the present invention is to provide an improved and simplified character recognition system.

Another object of the invention is to provide for recognizing characters by counting the number of black areas scanned and eliminating different ones of the characters from further consideration based on truth statements derived from a large number of actual field tests of identification of characters based on the number of black areas.

An important object of the invention is to provide for dividing the character scanned into a number of zones, and for sequentially determining the number of black segments or areas in each zone and eliminating different ones of all possible characters from further consideration as the scanning progresses based on truth statements relating the black count in each zone, to the probability that the character is not one of certain characters.

It is also an object of the invention to progressively eliminate the possibility of a particular character being scanned being one of a number of different groups of characters, in accordance with the value of the black count during successive intervals of time during a scan.

Yet another object of the invention is to provide for progressively eliminating the possibility of the character being scanned being one of different groups of characters, at different intervals, as the scanning process proceeds across the character.

Another important object of the invention is to provide for making a number of decisions as to the nature of the character scanned during different time zones of the scanning operation, as this lends itself to broadening or narrowing the probability in the different zones, thus making the system more adaptable to variations in printing techniques and different type fonts.

It is also another object of the invention to provide for making a count of the number of black areas vertically across a character in different zones during a scanning process, whereby the uniqueness of the black count in each zone assists in indicating the probability of the character being a particular one.

The foregoing and other objects, features and advantages of the invention will be apparent from the following more particular description of a preferred embodiment of the invention, as illustrated in the accompanying drawings.

Figure 3:
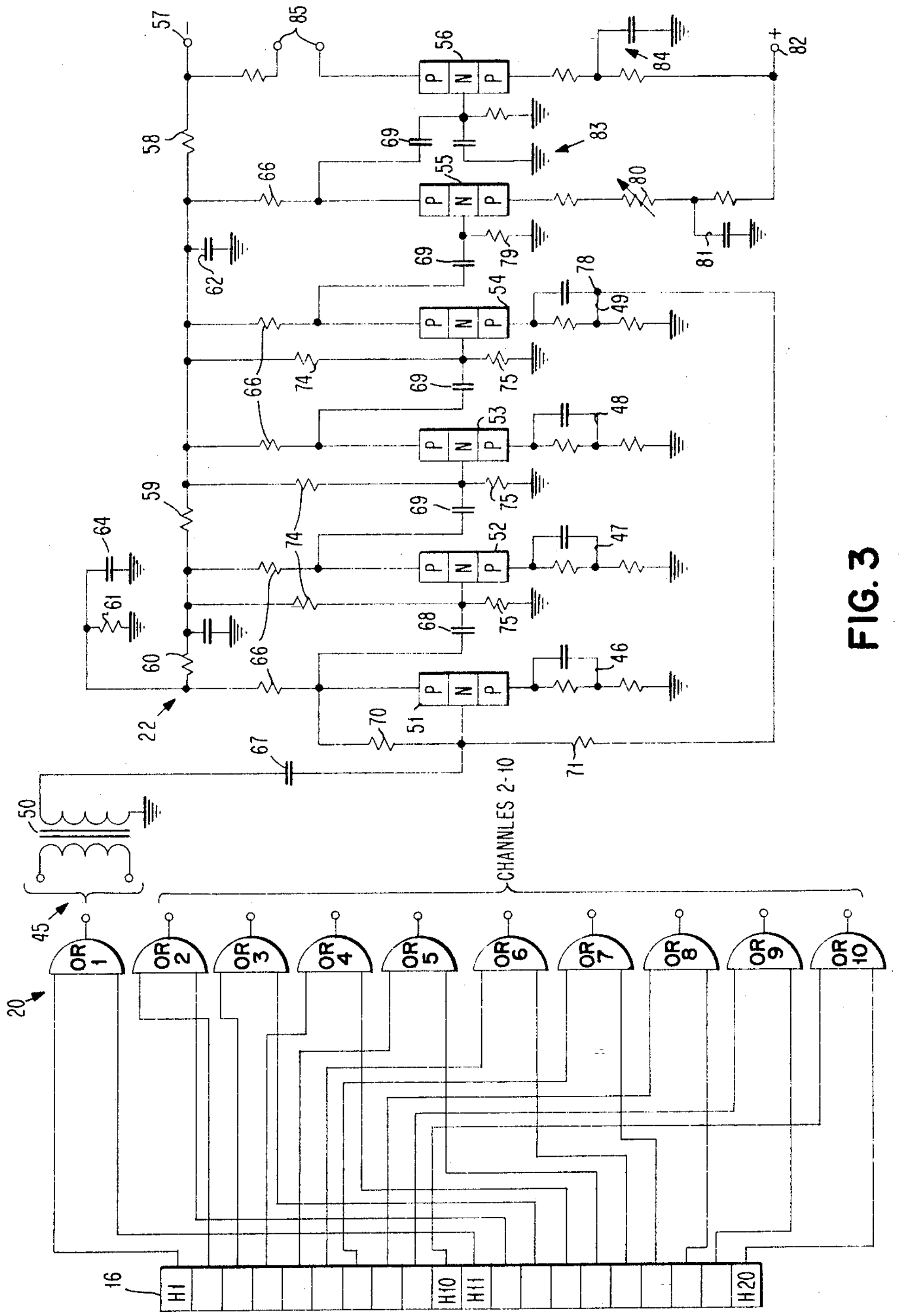
FIG. 3 is a circuit diagram of the channel reduction circuits and one of the channel amplifier circuits shown in FIG. 1.
Figure 4:
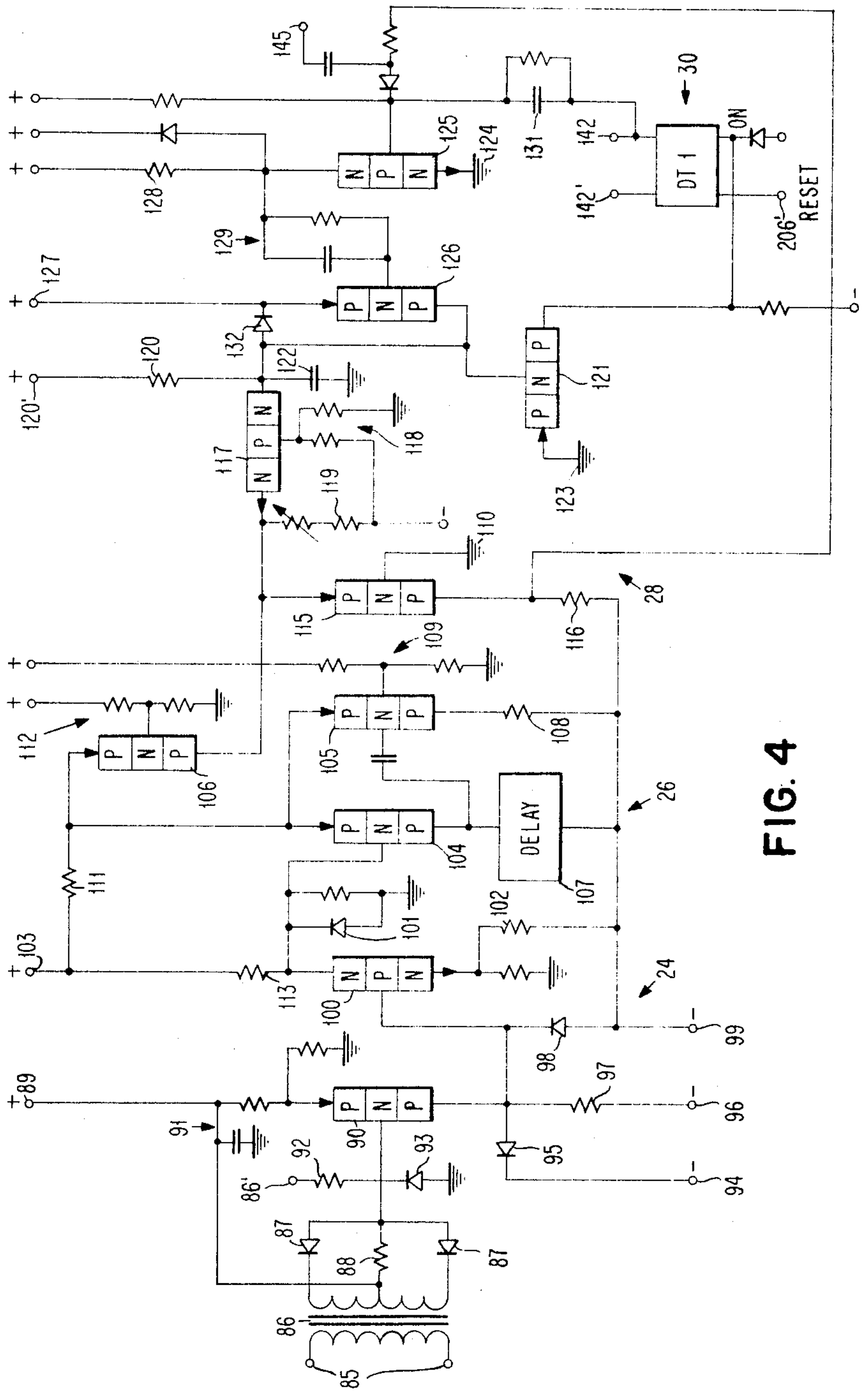
FIG. 4 is a circuit diagram of the rectifier, clipper, delay, smoother and integration circuits and shows the digital trigger for one of the channels shown in FIG. 1.

FIGS. *5a* through *5d* together provide a circuit diagram of the recognition circuitry used in connection with the circuits of FIGS. 3 and 4 in practicing the invention.

Figure 6:
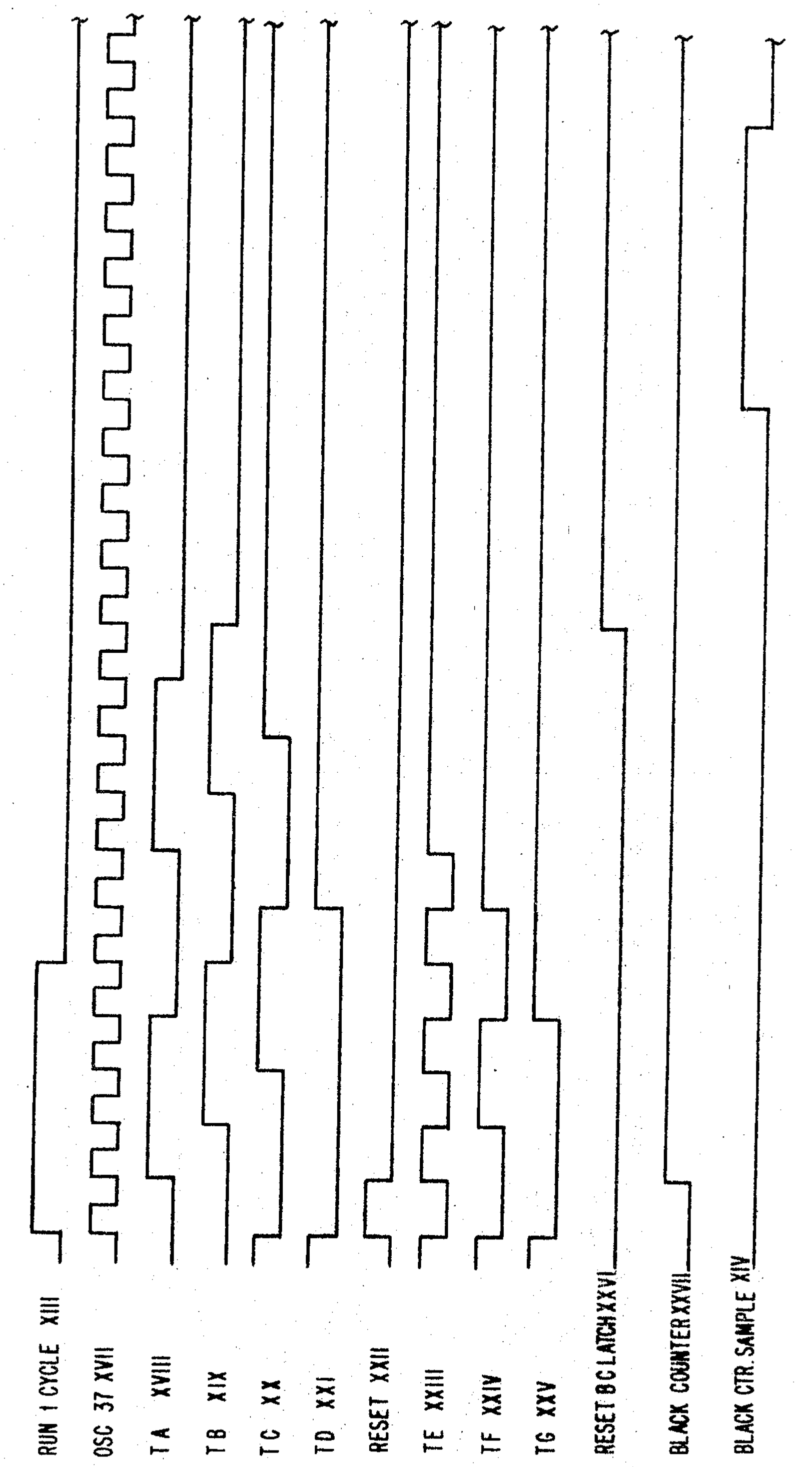

FIG. 6 is a timing diagram showing waveforms and time of operation of the character information sampling timing circuits for counting the number of black areas in a character.

Figure 7:
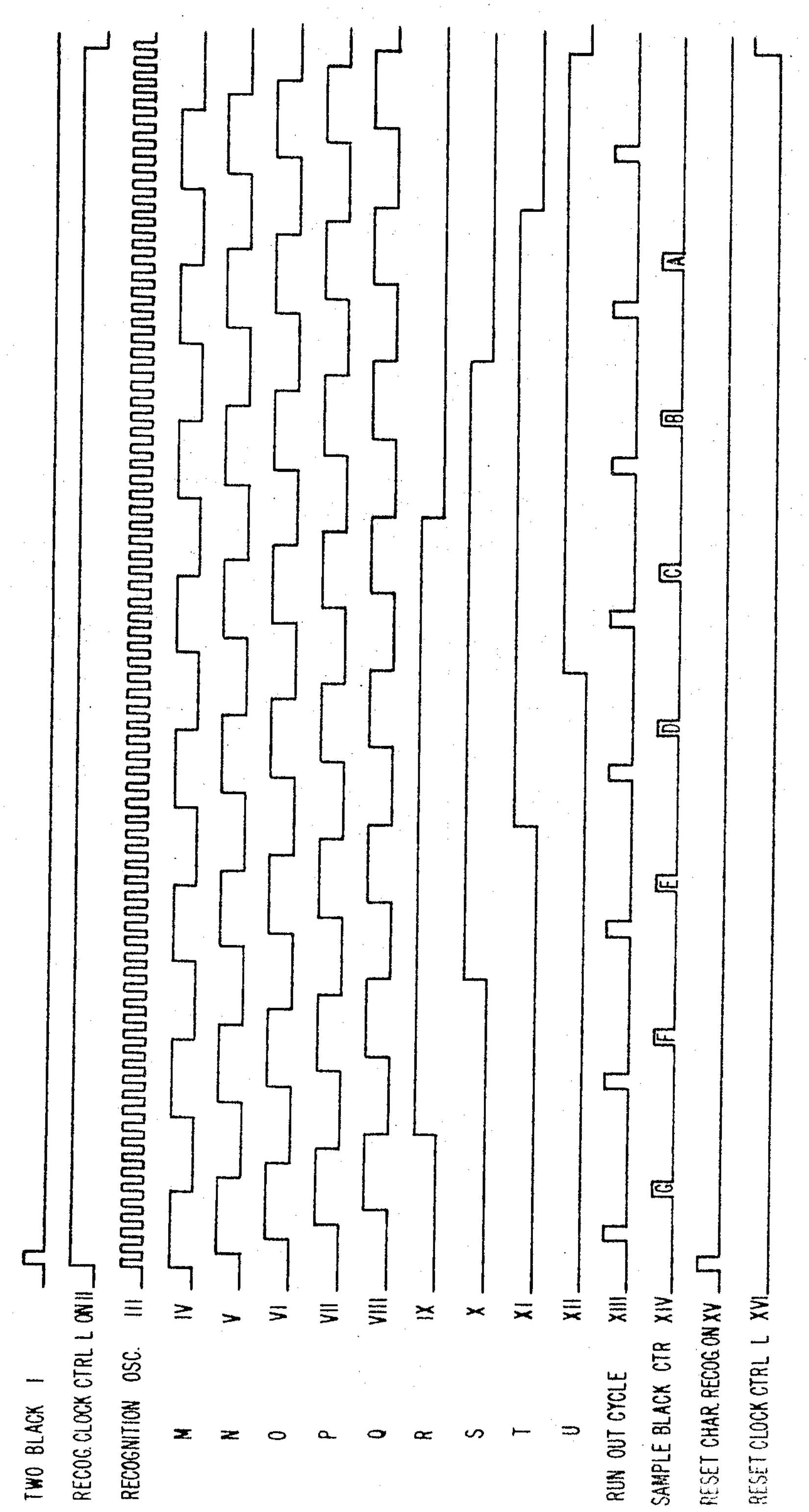

FIG. 7 is a timing diagram showing waveforms and time of operation of the recognition timing circuits during a character recognition operation.

FIG. 8 is a set of truth statements defining the logic circuitry used in determining the probability of a character being a particular one based on the black count at different intervals during the scanning operation.

FIG. 9 is a representation of the zero character in the well-known E–13B type font together with a typical black count for such a character.

FIG. 10 is a representation of the special character SS4, commonly known as the dash symbol and represented in the truth table by the symbol D, together with a typical black count therefor.

The various elements involved in the embodiment of the invention disclosed herein will first be described in a general manner in connection with FIG. 1, and will thereafter be described in greater detail with reference to the remainder of the figures.

Figure 1:
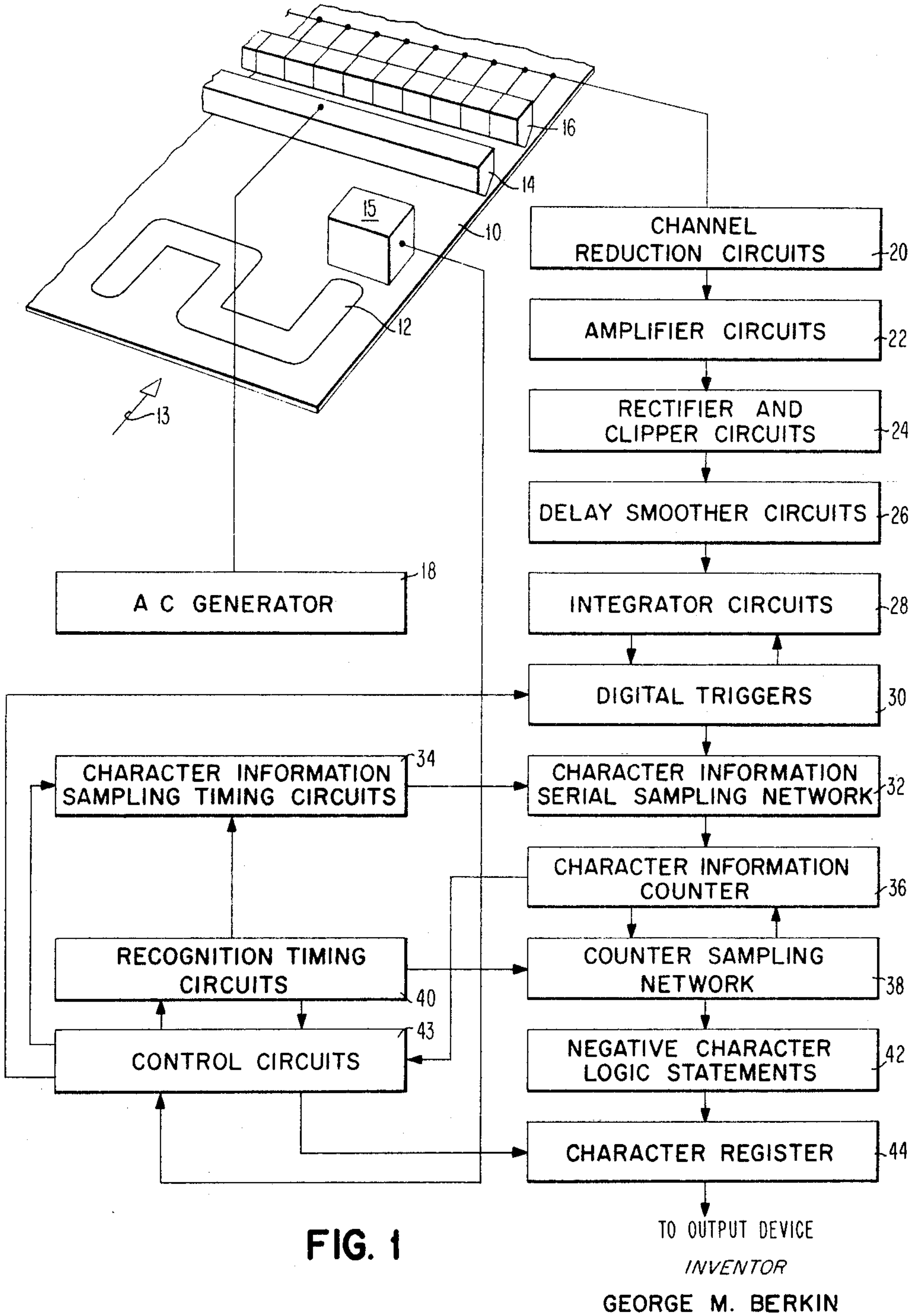
FIG. 1 is a block diagram showing the various component parts of the embodiment of the invention disclosed herein.

In FIG. 1 there is shown at 10 a fragmentary portion of a document or other surface-forming means carrying indicia 12. The indicia shown is in the form of the numeric character "2." The character is printed by means of magnetic ink and is adapted to be sensed by magnetic scanning means.

The document 10 is advanced in the direction of the arrow 13 by any conventional means, and the character 12 is carried past magentic write and read heads 14 and 16, respectively, positioned to scan the character as it passes thereby. The write head 14 is powered from an A.C. source 18 which may conveniently be, for example, a 30 kc. generator, for reasons which will be hereinafter described.

The rear head 16 is actually a plurality of read heads positioned adjacent to one another to provide multi-channel scanning of characters passing thereunder. It is desirable to provide write and read heads of sufficient length with respect to the vertical height to be read to insure scanning of the entire height of each character even though successive groups of characters may be displaced vertically with respect to each other or printed on various horizontal lines. Accordingly, a single extended write head is used, and in conjunction therewith a read head is employed having in the arrangement described a number of heads which is an even multiple of the minimum number of heads desirably employed to fully scan a single character. Outputs from the multichannel head head are delivered to channel reduction circuits 20.

In the embodiment of the invention described herein, the channel reduction circuits receive outputs from 20 magnetic heads in the read head 16 and reduce these to ten channels for subsequent manipulation. The ten channels represent a sufficient length of the read head 16 to insure multichannel scanning of the entire height of the character 12.

As will be evident to one skilled in the art, various types of scanning means may be employed. For example, optical scanning means may be employed to produce output signals substantially identical to those obtained by the magnetic scanning means shown in the drawing. The essential objective is the production of signals on ten channels representing horizontal scanning through a character to be recognized. It will be also evident that the selection of ten channels is arbitrary, depending upon the configuration of the channels to be identified as well as the total number of characters to be recognized.

As shown in FIG. 1 each of the ten channels forming the output from the channel reduction circuits 20 is delivered to an amplifier circuit 22 serving to amplify the signal received. The amplified signals are delivered to rectifier and clipper circuits 24.

Numeric or other characters to be recognized may be variously formed or stylized, and for any given width of vertical line employed in printing a character the rate of travel of the document bearing the character and the frequency of the A.C. source powering the write head are desirably selected to provide when the read head of a given channel crosses a character line, a burst of an A.C. wave of multiples of approximately two cycles duration. For example, stylized characters may be employed having a line width formed of one or more increments of .013 inch in width, and the character may be advanced past the read head at such a rate that the line increments of .013 inch pass the read head within 65 microsecond intervals. Under these conditions if a 30 kc. energizing signal is employed there will occur two cycles of the 30 kc. signal during passage of each line increment width. Thus, a four cycle signal would indicate a black area of two character line increments.

In the rectifier circuits indicated at 24 in FIG. 1, a full wave rectification is performed and in the clipper circuits also indicated at 24 the rectified wave is further amplified and clipped between upper and lower levels. Here is passed only the portion of the waves between the upper clipping level and the lower clipping level. The upper clipping level is sufficiently low in a negative direction to cut out substantially all the background noise obtained in the signal. The lower clipping level is sufficiently high in a positive direction to provide a uniform amplitude level for the information carrying portions of these signals. This clipping is desirable for the reason that various printings which may be printed from various inks and from inks of various thickness, and printing variations in individual characters or in successive characters, will give rise to wide variations in amplitude of the output signals from the read heads, and accordingly wide variaitons in amplitude of the information-bearing portions of the channel signals. Furthermore, prior to clipping the wave was sufficiently amplified that the clipped wave is substantially a square wave.

The clipped and shaped rectified wave is delivered to a delay smoother circuit 26 in FIG. 1. This circuit functions to delay the signal pulses and to reshape the delayed signal pulses which are then combined with the clipped and shaped wave by means of an OR circuit to produce a combination output which is an extended negative-going black indicating pulse which extends for a slightly longer period than the corresponding original 30 kc. signal bursts. Between the negative-going black indicating pulses are positive-going white indicating pulses. Occasional high level noise pulses will occur in the amplifier output circuit. In these noises, pulses are of sufficient amplitude to pass through the clipping and shaping circuits, they may appear during the negative-going extended black pulse referred to hereinbefore.

In FIG. 1 the outputs of the integration circuits 28 are shown as being delivered to digital triggers or latches 30. One trigger is provided for each of the ten channels and the digital trigger in each channel is turned on whenever integration in that channel has proceeded to the threshold value. The rate at which integration progresses and the threshold level are selected to provide integration to the threshold level in a time interval somewhat less than that of two complete cycles of the 30 kc. energizing wave. Thus integration will pass through a theshold level in less than the time of one character line increment. Upon turning on of a digital trigger, its integration circuit is reset in preparation for a next successive integration cycle.

The contents of the digital triggers are sampled by a character information serial sampling network 32 under the control of character information sampling timing ring circuits 34 for operating a character information black counter 36 to determine the number of black areas in each scan of a character during successive time intervals or zones across the character. The contents of the black counter are successively sampled by a counter sampling network 38 during each of the plurality of time intervals under the control of recognition timing circuits 40. The black count from the counter sampling network 38 is applied to a plurality of negative character logic or truth statements 42 the arrangements of which are based on examinations of actual gathered field data and represent the probability that a particular black count in a particular time zone has shown from experience that these conditions substantially eliminate possibility of particular different characters being the one which is being scanned. The outputs of the negative character logic statements are applied to a plurality of latches in a character register 44 which were initially turned on at the beginning of a cycle, and are progressively turned off during the different intervals, resulting eventually in only a single register latch being left on which is representative of the character being scanned. Sensing means such as a photodevice 15 is utilized to sense the leading and trailing edges of the document 10 for initiating the operation of control circuits 43 to prepare the digital triggers 30 and the recognition timing circuits 40 as well as the character information sampling circuits 32 for a sampling cycle.

Figure 2:
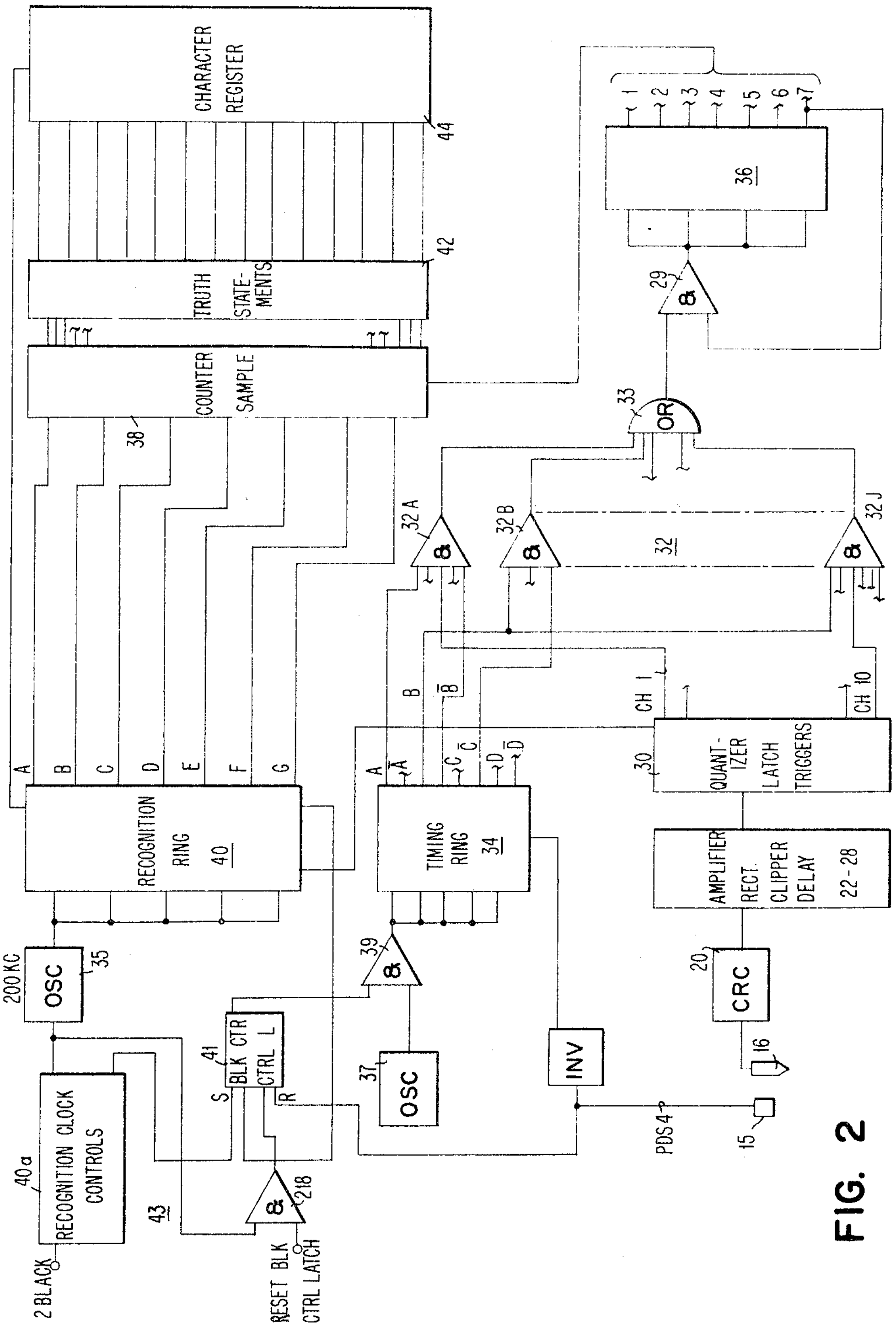
FIG. 2 is a schematic block diagram of a character recognition system embodying the invention.

Referring generally to FIG. 2, it will be seen that read heads 16 are connected through the channel reduction circuits 20 and amplifier, clipper and integrator circuits 22–28 to a plurality of quantizer latches or digital triggers 30 for turning different ones on depending which channel being scanned has a black portion or increment. The conditions of the digital triggers 30 are periodically scanned at timed intervals by means of the serial sampling network 32 and the black timing ring 34 under the control of the control circuits 43 and the recognition timing ring 40 to determine the number of black increments or areas in each character at each particular time interval or zone. This is accomplished by sampling a plurality of the AND circuits 32A through 32J the outputs of which are mixed in an OR circuit 33 and used to advance the black sample counter 36 through AND circuit 29. The ouptut of the black sample counter 36 is applied through sampling network 38 to a plurality of logic truth statements 42 in conjunction with timed pulses from the recognition timing ring 40 at each of a plurality of predetermined timed intervals or zones A through G for determining the black count at each of these time intervals. The outputs of the truth statements are used to sequentially turn off different ones of a plurality of latches in the character register 44 in each of the time intervals, depending on the value of the black count, so that eventually only one of the latches in the character register 44 will remain on, thus determining the identification of the character being scanned.

The recognition timing ring 40 is turned on in response to a 2 black count from counter 36 when a character is first detected, and is run by a 200 kc. oscillator 35 under the control of the timing control circuits 43. The black counter timing ring 34 is normally maintained in a reset condition by a negative PDS4 signal from the sensing device 15 when there is no document present. As soon as a document is sensed by the device 15, this signal disappears and the black counter timing ring 34 will be enabled, and is free-running under the control of a one megacycle oscillator 37 which through an AND circuit 39 runs the counter ring in conjunction with the signal from a black counter control latch 41 which is initially turned off by detection of a document by the sensing device 15 through the OFF output of the recognition clock control circuit **40*a*. As soon as the recognition clock ring 40 is turned on, it develops a run one cycle signal which is applied to the black counter latch 41 to effect operation of black counter ring 34 for one cycle of operation. After one cycle the latch 41 is reset by a signal from the quantizer sample circuit 32. The recognition ring 40, at predetermined timed intervals, develops output pulses over the lines G, F, E, D, C, B, A, respectively, for effecting sampling of the black counter 36 through sampling network 38** to determine the number of black areas of the character in each of the time zones or intervals.

The output of the black counter sample network 38 is applied to a plurality of logic truth statements 42 in conjunction with the timed pulses G–A from the ring 40 and the outputs of these truth statements are applied to turn off different ones of a plurality of character latches in the character register 44 in accordance with the probabilities determined by a field experience so as to eventually leave only one of the character recognition latches 44 turned on designating the particular character being scanned.

In FIG. 3 there is shown in greater detail the multichannel read head indicated generally at 16, the channel reduction circuits indicated generally at 20 and the amplifier circuit for one channel indicated generally at 22.

For example, there is indicated generally at 16 twenty read heads H1 through H20, respectively. The read heads H1 through H10 are connected to OR circuits OR1–OR10, respectively. The read heads H11–H20 are also connected to the OR circuits OR1–OR10, respectively. Thus the OR circuits provide outputs for ten channels and these ten outputs are derived from twenty read heads. It will be evident that additional read heads may be employed which need not be in multiples of ten, in order to provide a broader scanning width by the read heads while still producing only ten channel outputs for delivery through ten subsequent channel circuits, the only requirement being that characters to be scanned have a vertical height of not greater than ten read heads. It will be evident that this arrangement affords the possibility of the lower half of a character being carried in the outputs of OR circuits 1–5 and the upper half of a character being carried by the outputs of OR circuits 6–10 as will be seen from the following explanation. This will not effect the character recognition features of the present invention as will be clear from the description as set forth hereinafter.

As indicated at 45 in FIG. 3, the output of OR circuit OR1 is delivered to the input side of a coupling transformer 50 serving to couple this OR circuit with an amplifier 22. Each of the other OR circuits OR2–OR10 have their outputs delivered to an identical amplifier not shown in the drawings. The channel amplifier 22 is a six-stage transistor amplifier employing low currents and low voltages for low noise level operation. The amplifier thus provides a high signal-to-noise ratio amplification and is designed for a mid-frequency of 30 kc. in accordance with the energizing frequency employed in the write head 14. The amplifier employs six PNP transistors 51–56. A suitable negative potential source is connected at 57 and through a succession of filtering and voltage reduction resistors 58, 59, 60 and 61 provides voltage regulation and filtering of circuit feedback to provide a suitable supply potential to one side of each of the transistor load resistors 66 for transistors 51–55, respectively. The transistors 51, 52, 53 and 54 each has its emitter biased below ground by means of a resistor-capacitor network as indicated at 46–49, respectively. The base of transistor 51 is biased from the collector by means of a resistor 70 and is coupled through a resistor 71 to a feedback source connected at 78 to the emitter bias network 49 of the transistor 54. This feedback is a degenerative feedback providing circuit stabilization.

Each of the transistors 52, 53 and 54 has its base biased between its collector supply voltage and ground by resistors 74 and 75, respectively. The base of transistor 51 is connected to the input transformer 50 by means of a coupling capacitor 67. Transistor 52 has its base coupled to the collector output of transistor 51 through a capacitor 68. The value of this capacitor is selected to provide a desired low frequency response for the amplifier. This low frequency response may be, for example, approximately 3 db down at 1 kc. The successive transistors 53, 54, 55 and 56 each has its base coupled to the collector of the preceding transistor by means of a capacitor 69.

The transistor 55 has its base biased at ground by means of a resistor 79 and its emitter connected to a variable resistor 80 and a resistance-capacitor network indicated at 81 to a suitable positive potential source at 82. The variable resistor 80 provides a gain control for the amplifier. The last stage transistor 56 has its emitter coupled to the potential source 82 through a capacitor-resistor network indicated at 84 and has its base biased to ground by means of a capacitor-resistor network indicated at 83. This latter network provides a high frequency roll-off. This roll-off level may be, for example, 3 db down at 60 kc. The amplifier circuit output is taken between the collector of transistor 56 and the potential source 57 at terminals 85 as an A.C. signal. This output may be represented for example by bursts of alternating current as black portions of a character are scanned.

In FIG. 4 there is indicated generally at 24 one of ten channel rectifier and clipper circuits indicated by the block 24 in FIG. 1. There is indicated generally at 26 the delay smoother circuit receiving the output of the rectifier and clipper circuits, and there is indicated generally at 28 the integration circuit receiving the output from the delay smoother circuit.

The output from terminals 85 of the channel amplifier circuit described in FIG. 3 is delivered at terminals 85 of FIG. 4 to the input winding of a coupling transformer 86. The output winding of the transformer is provided with a mid-tap coupled to a resistor 88, and two ends of the winding are connected to the cathodes of diodes 87. This arrangement forms a full wave rectifier circuit. The mid-tap of the transformer is also connected to a suitable positive potential source at 89. The output of the rectifier is connected to the base of a PNP transistor 90. The base of transistor 90 is biased to a suitable potential between potential 89 and 86′ through the rectifier network 87 and resistor 88 and through resistor 92, and is coupled to the cathode of a diode 93, the anode of which is grounded. The output of the rectifier is in the form of a plurality of negative-going half-wave pulses which may, for example, have a base line of +4 volts. The diode 93 serves to clip the negative-going peaks of this rectified signal at a 0 volt level. The resulting waveform is indicated by the portion of the waveform II in FIG. 2*a* of Patent No. 3,165,717, which issued on January 12, 1965, based on application Serial No. 804,996 of Paul F. Eckelman et al. filed April 8, 1959 and assigned to the assignee of the present invention.

The transistor 90 has its emitter coupled through a bias network indicated at 91 to the supply voltage 89. The emitter of the transistor 90 is biased so that the transistor is normally in an OFF condition. The input signal to the base must be more negative than the threshold value established by the emitter bias before the transistor will become conductive. Accordingly, the portion of the incoming signal more positive than the threshold value will not be passed by the transistor. This transistor establishes the upper clipping level of the signal, and the output of transistor 90 will be in response to the portion of the signal lying between these two clipping level lines.

The transistor 90 has its collector output connected to a suitable source of negative potential 96 through a resistor 97 serving to establish a high gain through the transistor. The collector is also connected to the cathode of a diode 98 having its anode connected to a lesser negative voltage source 99. The diode 98 and the voltage of the source 99 limit the negative-going output of the transistor. If, for example, the potential 99 is −6 volts, the negative output level limit will be established at −6 volts. The collector is also coupled to the anode of a diode 95, the cathode of which is connected to a negative voltage source 94. The negative source 94 is less negative than the negative source 99 and the diode 95 is connected in a reverse direction from the diode 98, thus serving to limit the positive-going output of the transistor. The voltage level of 94 may for example be −4 volts.

The output of transistor 90 is fed to the base of a NPN transistor 100. The transistor 100 has its emitter biased negative by means of a suitable network indicated at 102 connected to the voltage source 99, and has its collector biased positive through a resistor 113 connected to a source of positive potential at 103. The transistor 100 serves as an amplifier and as an inverter, and has its collector output clipped by means of a diode 101 to prevent its output from going more negative than ground. Thus the output of this transistor has a positive potential base line and information therein is in the form of negative-going excursions which do not cross a zero potential value, providing a squared and clipped signal.

The output from transistor 100 is fed to the delay smoother circuit indicated generally at 26 in FIG. 4. This is a current switching circuit and employs three PNP transistors 104, 105 and 106. The transistor 104 has its collector connected to the negative voltage source 99 through a delay line 107. The transistor 105 has its collector biased from the negative voltage source 99 through a resistor 108. The transistor 106 has its base biased between a suitable positive voltage source and ground by a network indicated at 112. The transistor 105 has its base biased between a suitable positive voltage source and ground by means of a network indicated at 109. The emitters of the transistors 104, 105 and 106 are connected together and are connected to the positive voltage source 103 through a resistor 111.

As has been previously noted, the information-bearing signals are in the form of bursts of a 30 kc. signal. These bursts represent black areas on the document scan, and white areas are of course represented by the absence of 30 kc. signals. A function of the delay smoother circuit is to close the gaps in the rectified shaped 30 kc. signal without adversely effecting the portion of the incoming signal not carrying information, that is, not carrying the 30 kc. signal. The circuit including the transistors 104, 105 and 106 accomplishes this closing of the gaps by delaying the input signal and delivering both the input and the delayed input signal through an OR circuit which is formed by the transistors 104, 105 acting in conjunction with the transistor 106. The operation of this circuit will now be described.

Normally the transistors 104 and 105 are nonconductive, and transistor 106 is conductive. If either transistor 104 or transistor 105 becomes conductive, the emitter voltage of transistor 106 is reduced, and transistor 106 will become nonconductive. When a rectified clipped 30 kc. signal is received at the base of the transistor 104, this transistor becomes conductive during the zero level periods of the signal, reducing the emitter voltage of the transistor 106 and causing it to become nonconductive during these periods. In order to prevent the transistor 106 from becoming conductive during each positive-going period between rectified shaped 30 kc. half-cycle pulses, the delay line 107 and the transistor 105 are provided. As will be known to those skilled in the art, the delay line 107 serves to provide an apparent impedance change between the collector of the transistor 104 and the negative supply voltage 99, and the change is such as to cause the impedance of the delay line to appear to decrease a predetermined time after the transistor 104 becomes conductive, and to appear to increase at the same time interval after the transistor 104 has become nonconductive. This delay line is desirably selected to operate at a time interval equal to approximately one quarter of the 30 kc. wave length. This time is approximately 8.4 microseconds. Thus the delay line acts to change the voltage level at the collector of transistor 104 approximately 8.4 microseconds after the transistor 104 has become conductive and 8.4 microseconds after the transistor has become nonconductive.

Insofar as this circuit is concerned, the effective operation of the delay line is at the end of the 8.4 microsecond interval after the transistor 104 has become nonconductive. When the transistor 104 becomes nonconductive, the base of transistor 105 becomes more negative and the transistor 105 conducts until the transistor 104 again becomes conductive, or until the end of the 8.4 microsecond interval when the delay line impedance increases.

As a result of the operation of this circuit, the transistor 106 will be nonconductive during the entire time interval of a burst of rectified 30 kc. signal, and will be nonconductive for 8.4 microseconds thereafter. Thus there is provided a square-wave signal representing a black area scanned by the read head. The 8.4 microsecond extension is added regardless of the length of the black indicating signal received. Accordingly, the 8.4 microsecond extension may be accommodated in the subsequent recognition circuitry.

The output of the transistor 106 is connected to the emitters of PNP transistor 115 and NPN transistor 117. The integration circuit indicated generally at 28 comprises the transistor 117 and a PNP transistor 121 acting in conjunction with an integration capacitor 122 as will be hereinafter described. The collector of transistor 115 is connected through a load resistor 116 to the negative voltage source 99. The emitters of transistors 115 and 117 are connected through load resistors 119 to a suitable source of negative voltage. The base of the transistor 117 is biased negative by means of a resistance network indicated at 118. The base of transistor 115 is connected to ground at 110. The collector output of transistor 117 is connected through a load resistor 120 to a suitable source of positive potential 120'. The integration capacitor 122 is connected between the collector of transistor 117 and ground.

When transistor 106 is conducting, transistor 115 will be conducting, and the voltage of the emitter of transistor 117 will be at ground potential through transistor 115, cutting off transistor 117. When transistor 106 is nonconductive, the emitter voltage of the transistor 117 will be negative as a result of the voltage drop across the resistors 119, and transistor 117 will be conductive. Normally, as will be hereinafter described, when the transistor 117 is nonconductive, the integration capacitor 122 carries a positive charge, for example, +4 volts. When the transistor 117 becomes conductive, the capacitor 122 is discharged through the transistor 117 at a constant rate as determined by the resistance values of the resistors 119.

The transistor 121 has its emitter connected to ground at 123 and its base connected to the integration capacitor 122 and to the collector of a PNP transistor 126 which at this time is not conductive. The potential of the base of transistor 121 will follow the potential across the integration capacitor 122, and when the integration has proceeded to a threshold value, the transistor 121 will become conductive, indicating the completion of an integration. The collector of the transistor 121 is connected to a source of negative potential through a load resistor and to the ON side input terminal of means such as a digital trigger DT1 which represents one of the ten quantizer latches or triggers 30 of FIGS. 1 and 2. Thus the trigger DT1 is turned ON when the transistor 121 becomes conductive as a result of the completion of an integration. The trigger DT1 may be one of various well known conventional bistable triggers or latches or the like capable of being turned on by a positive-going pulse.

When the digital trigger DT1 is turned ON, its OFF side output at 142' will go negative and its ON side output taken on line 142 becomes more positive and this output is fed through a resistor capacitor network indicated at 131 to the base of a NPN transistor 125. The transistor 125 has its emitter connected to ground at 124 and its collector connected to a suitable source of positive potential through a resistor 128. The collector of transistor 125 is also connected to a capacitor-resistor network indicated generally at 129 to the base of the transistor 126. The emitter of transistor 126 is connected to the source of positive potential 127 and is connected to the cathode of a diode 132, the anode of which is connected to the integration capacitor 122.

When the base of transistor 125 goes more positive as a result of turning ON the trigger DT1, the transistor 125 becomes conductive, causing the transistor 126 to become conductive, which causes the transistor 121 to become nonconductive and recharges the integration capacitor 122 from the positive potential supply 127. Thus when he digital trigger DT1 is turned ON, the integration circuit is reset. The collector of transistor 125 is connected to a suitable positive potential source through a diode 134 arranged to limit the positive potential rise at the collector of transistor 125.

Figure 5A:
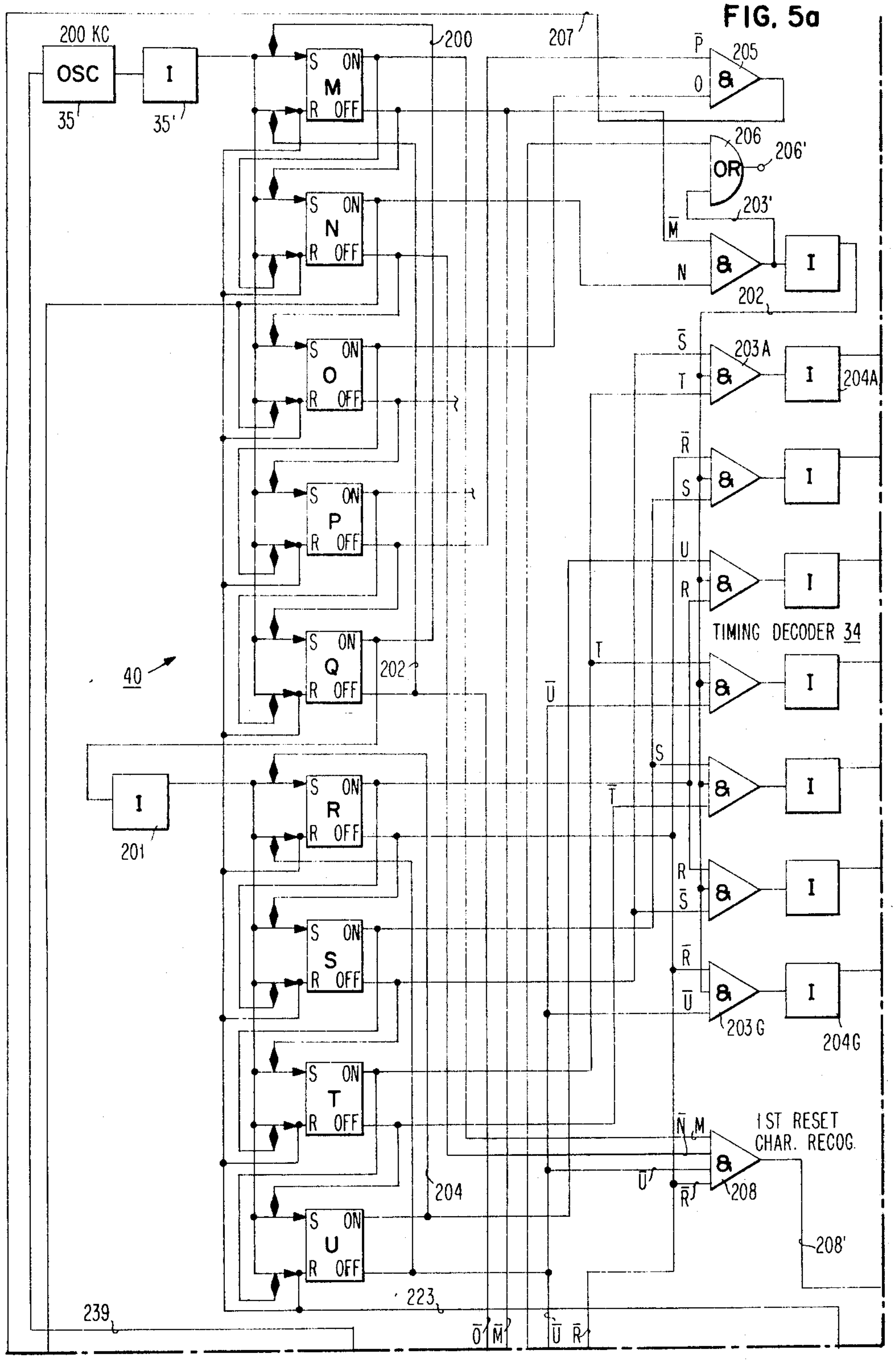
Figure 5B:
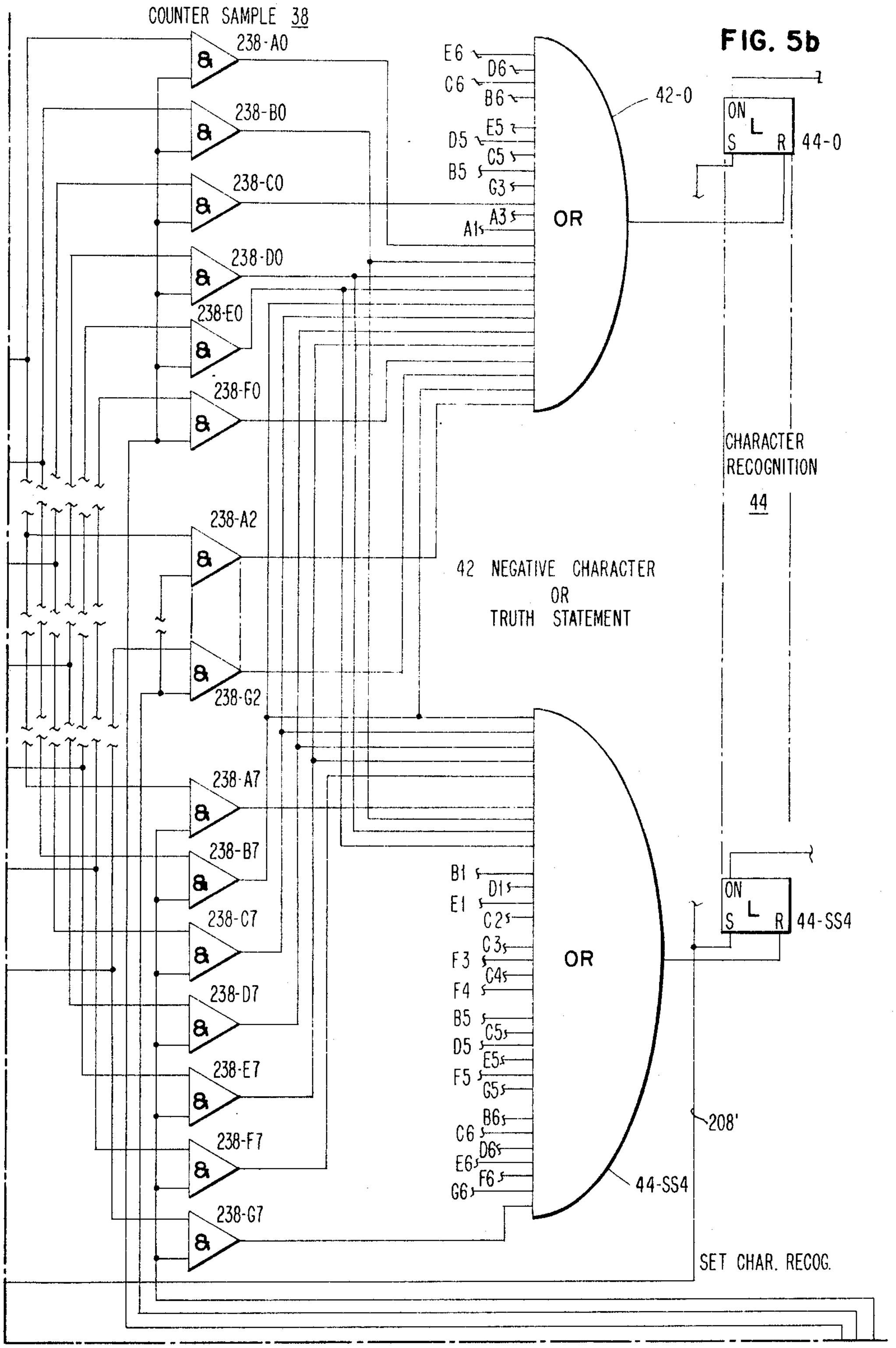

FIGS. 5*a*, 5*b*, 5*c* and 5*d*, taken together, show in detail the circuitry of the character information serial sampling network 32, the character information sampling timing circuits 34, the character information counter 36, the counter sampling network 38, the recognition timing circircuit 40, the negative character logic truth statements 42, the character register 44 and the control circuits 43 of FIGS. 1 and 2. Referring in particular to FIG. 5*a*, the recognition timing circuits 40 are shown as comprising a clock ring having a plurality of low order triggers M–Q and high order triggers R–U arranged to be driven by a 200 kc. oscillator 35 through an inverter amplifier 35' for providing outputs to a plurality of AND circuits comprising the timing decoder portion of the recognition timing circuits 40. For example, AND circuits 203A through 203G are connected to their respective amplifiers 204A through 204G to provide timed output pulses G, F, E, D, C, B, A shown in the curve XIV on FIG. 7 marked sample black counter, for effecting sampling of the black counter 36 at these respective scanning times of a character.

As shown, the low order ring triggers M–Q are arranged to be advanced as follows: Trigger M is turned ON by a pulse from the oscillator 35 in conjunction with the positive output signal from the ON terminal of trigger Q when trigger Q is OFF, this output being applied over line 200. When trigger M is turned ON, trigger N will be turned ON with the next pulse from the oscillator 35 in conjunction with the positive output from the OFF terminal of trigger M which is now turned ON. Successive triggers O, P and Q are similarly advanced in succession on following the pulses from the oscillator 35 producing pulses as shown in curves IV–VIII of FIG. 7 labeled correspondingly. The triggers R through U of the high order recognition clock ring are controlled from the low order ring through an amplifier 201 from trigger Q so that trigger R is turned ON when the ON output of trigger Q goes positive when trigger Q is turned OFF, in conjunction with the ON output from the trigger U which is positive because the trigger U is OFF.

Trigger R of the high order recognition timing ring will be turned ON accordingly, when the trigger Q goes OFF and when trigger U is OFF. Trigger S will be turned ON the next time the trigger Q is turned OFF, by reason of a positive signal from the ON terminal of trigger Q when it is turned OFF, being applied through amplifier 201 to the set terminal of trigger S, in conjunction with the positive OFF signal from the trigger R which is now turned ON. Triggers T and U are likewise turned ON in succession on following turnings OFF of the trigger Q to provide the pulses R, S, T, U as shown by curves IX–XII in FIG. 7. The ON output O of trigger O and the OFF or $\overline{P}$ output of trigger P are combined in an AND circuit 205 to provide a run-one-cycle signal over line 207 for effecting operation of the timing control circuits 43 as will be explained hereinafter, and providing the pulses shown in the curve XIII of FIG. 7, and which occur just prior to each of the black counter sampling pulses G, F, etc., of curve XIV. The OFF output $\overline{M}$ of the trigger M and the ON output N of the trigger N are combined in AND circuit 203' to provide a gating pulse for the AND circuits 203A through 203G over line 202 for producing the timed scanning pulses G through A of curve XIV in FIG. 7 in conjunction with selected outputs of the high order triggers S, T, and R, as shown.

The ON output of AND circuit 203' is used through OR circuit 206 to provide a signal for turning the quantizer latches or triggers TD1 in FIG. 4 off. AND circuit 208 is used to turn the character register latches 44 on over line 208'.

Figure 5C:
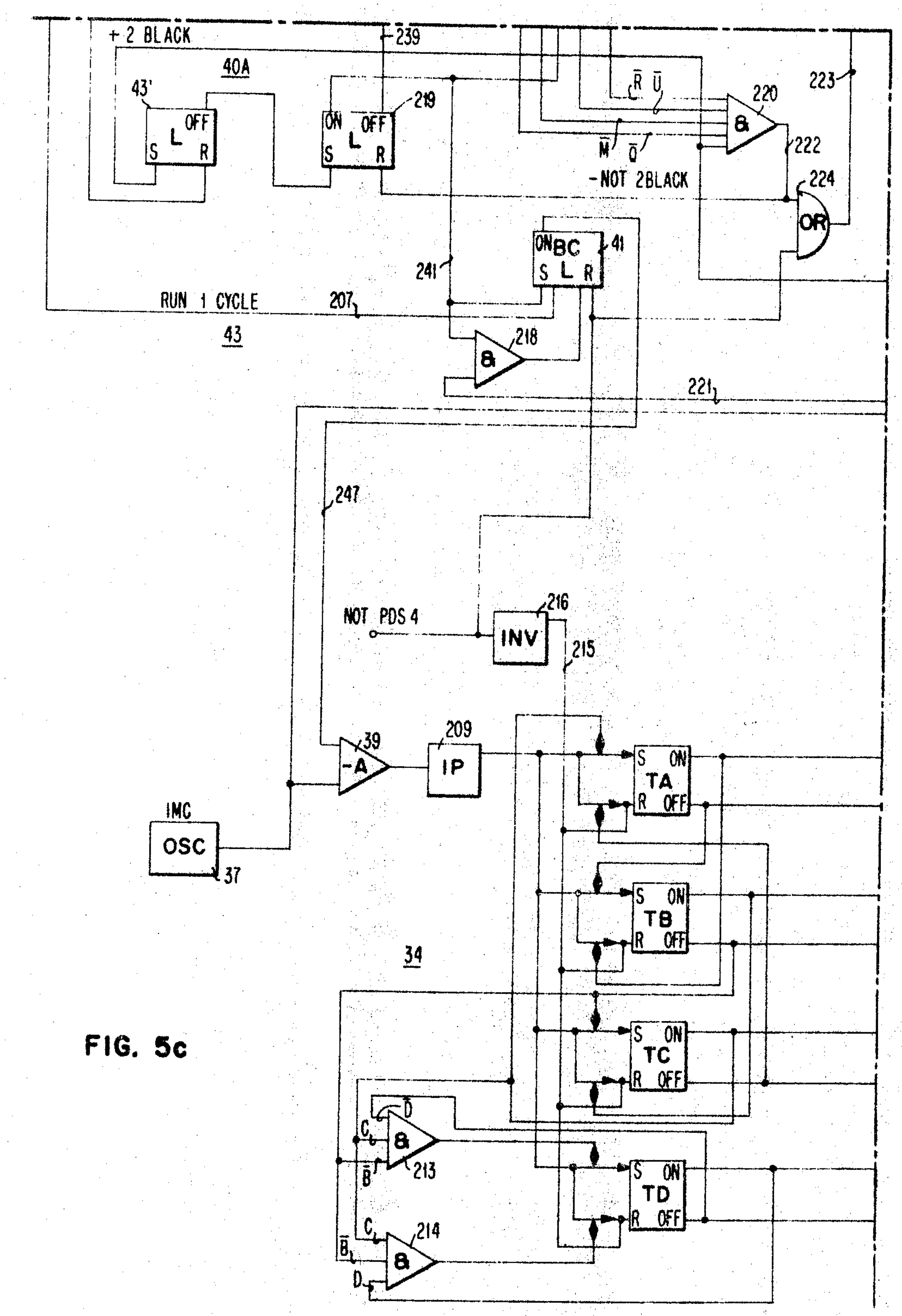
Figure 5D:
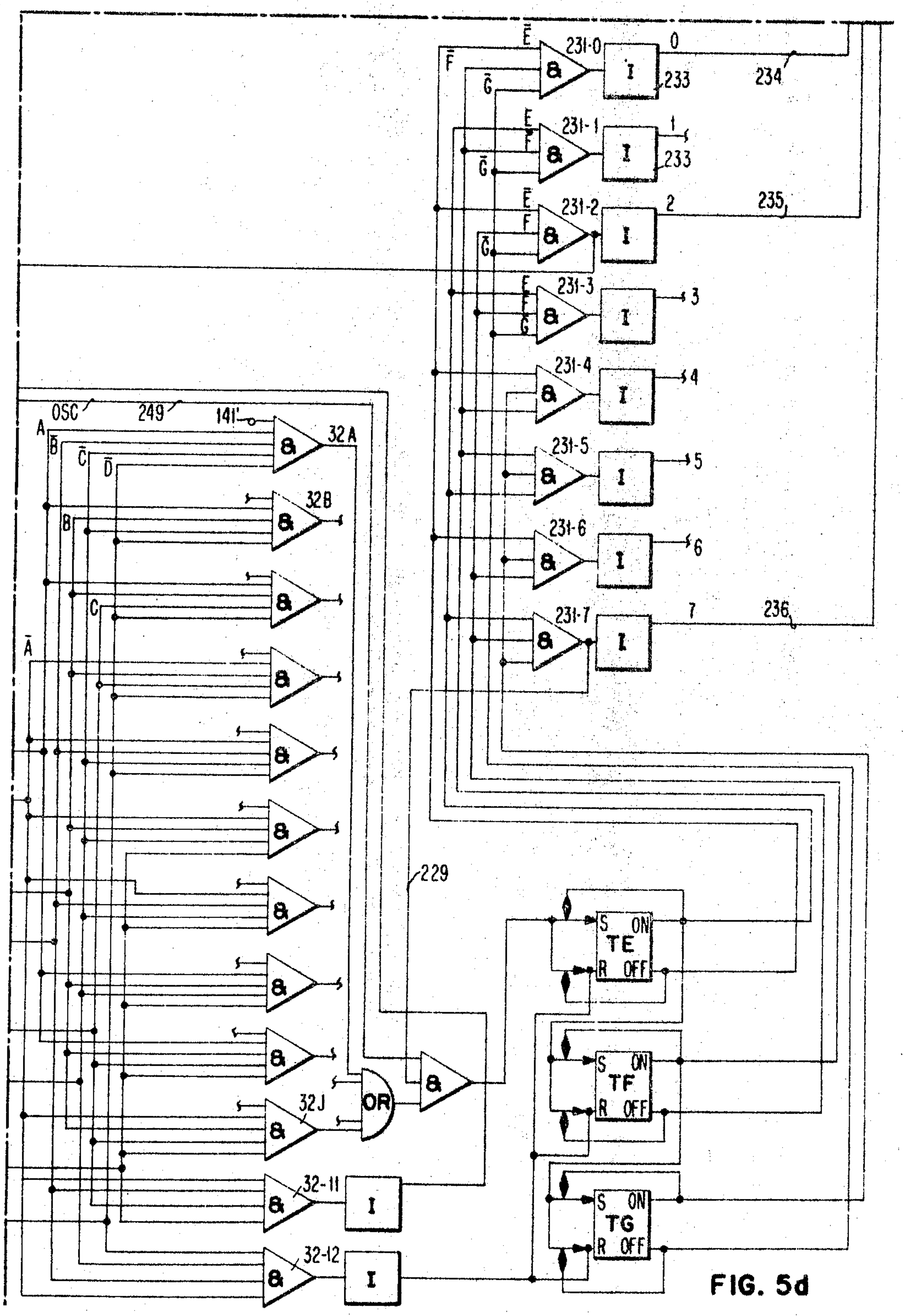

Referring to FIG. 5*c*, a plurality of triggers TA through TD are shown comprising the black sample ring of the character information sampling timing circuits 34. The triggers TA through TD are advanced by pulses from one megacycle oscillator 37 which is connected through AND circuit 39 and an amplifier 209 to the set inputs of the triggers TA through TC. The other input to the AND circuit 39 is provided by black counter latch 41 which forms a part of the timing control circuits 43. The trigger TA is turned ON by a pulse from the amplifier 209 in conjunction with a positive signal from the ON side of trigger TC over line 211 when the trigger TC is OFF. The trigger TA is turned ON as shown by the curve XVIII labeled TA in FIG. 6 and trigger TB is turned ON with the following pulse from the oscillator 37 being applied to the set terminal of trigger TB in conjunction with the OFF output of trigger TA which is now positive because the trigger TA is turned ON. Triggers TC and TD are likewise turned on in succession, trigger TC being gated on the pulse following the turning ON of trigger TB by the positive OFF output of trigger TB, and trigger TD being turned ON with the next succeeding pulse from the oscillator 37 in conjunction with the ON output of trigger TC, the OFF output of trigger TD and the OFF output of trigger TB all of which are negative and which are applied to the set terminal of the trigger TD through an AND circuit 213. Trigger TD is turned OFF by the ON output of trigger TC, the OFF output of trigger TB and the ON output of trigger TD being applied to the reset terminal through an AND circuit 214.

The sequence of triggers TA through TD is as follows:

| | | | | |
|---|---|---|---|---|
| OFF | $\overline{A}$ | $\overline{B}$ | $\overline{C}$ | $\overline{D}$ |
| 1 | A | $\overline{B}$ | $\overline{C}$ | $\overline{D}$ |
| 2 | A | B | $\overline{C}$ | $\overline{D}$ |
| 3 | A | B | C | $\overline{D}$ |
| 4 | $\overline{A}$ | B | C | $\overline{D}$ |
| 5 | $\overline{A}$ | $\overline{B}$ | C | $\overline{D}$ |
| 6 | $\overline{A}$ | $\overline{B}$ | $\overline{C}$ | D |
| 7 | A | $\overline{B}$ | $\overline{C}$ | D |
| 8 | A | B | $\overline{C}$ | D |
| 9 | A | B | C | D |
| 10 | $\overline{A}$ | B | C | D |
| 11 | $\overline{A}$ | $\overline{B}$ | C | D |

The triggers TA through TD therefore provide a free-running ring unless a reset signal is applied over line 215 from an amplifier 216 which is connected to sensing device 15 and provides a reset signal when no document is being sensed. The black sample triggers TA through TD as hereinbefore stated provide a free-running ring as soon as the reset signal on line 215 is removed by the sensing of the document, provided that the oscillator 37 signal is gated through the AND circuit 39 with the negative ON output of the black counter latch 41. The latch 41 is reset by a Not PDS4 signal from the sensing device 15 as well as by a signal from AND circuit 218 which ANDS the negative ON output of recognition clock control latch 219 and the reset signal over line 221 from sampling network 32, so that while characters are being sensed, the black sample triggers will be enabled to only run one cycle at a time as will be explained hereinafter. AND circuit 220 provides a reset signal over line 222 to reset the recognition clock latch 219 and also provides a signal through an OR circuit 224 and over line 223 to reset the clock 40 at the end of a recognition cycle.

Output signals from the triggers TA through TD of the black sample triggers 34 are applied to the plurality of AND circuits 32A through 32J, 32–11 and 32–12 so as to successively gate these AND circuits. The AND circuits 32A through 32J are connected to terminals 142' of respective ones of the digital triggers 30 such as trigger TD1 of FIG. 4, AND circuit 32A being connected for example, at the terminal 142' to the OFF output of digital trigger DT1 of FIG. 4. When trigger TA is ON, trigger TB is OFF, trigger TC is OFF, trigger TD is OFF, the AND circuit 32A will be gated, providing the digital trigger DT1 is ON, to provide an output signal to an OR circuit 33 indicating the sensing of a black area by the read head associated with the digital trigger DT1. The AND circuits 32B through 32J are likewise connected to their respective digital triggers and will also selectively provide outputs to the OR circuit 33 as scanned in succession by the triggers TA through TD, to indicate which of the digital triggers is turned ON, indicating a black area for the particular read head. Each time the OR circuit 33 is pulsed by an output from one of the AND circuits 32A through 32J, an input is provided to AND circuit 29 in conjunction with oscillator sample pulses over a line 249 and inhibit pulses over a line 229 from a timing decoder as will be explained hereinafter.

Out put signals from the AND circuit 29 are used to advance a black counter forming a portion of the character information counter circuit 36 and comprising a plurality of triggers TE, TF and TG arranged in cascade relation. Trigger TE is turned ON by a pulse applied to the set terminal from the AND circuit 29 in conjunction with a positive signal from the ON terminal which is positive when the trigger is OFF. On the next pulse from the AND circuit 29, trigger TE is turned OFF by the pulse from AND circuit 228 being applied to the reset terminal of trigger TE in conjunction with a positive signal from the OFF output of trigger TE which is positive when the trigger TE is ON. The positive-going signal from the ON output of trigger TE is applied to the set terminal of trigger TF when trigger TE is turned OFF and trigger TF is gated ON by the signal in conjunction with the positive signal from its own ON output terminal which is positive because the trigger TF is in the OFF condition. On the receipt of the next pulse from the AND circuit 29, trigger TE will again be turned ON because the signal from AND circuit 228 is gated by the positive signal from the ON terminal of trigger TE, and trigger TF remains ON. With the next pulse on the AND circuit 29, trigger TE is turned OFF by the pulse being applied to the rest terminal of trigger TE since the output from the ON terminal of the trigger TE is now negative. Trigger TF is turned OFF by the positive output signal from its OFF output terminal in conjunction with the positive output signal from the ON terminal of the trigger TE. Trigger TG is turned ON by the positive-going signal from the ON output of trigger TF in conjunction with the positive-going signal from its own ON terminal since the trigger TG is already OFF. The black sample counter 36 counts triggers TE through TG according to the following table:

| Count | TE | TF | TG |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

The output of the black sample counter 36 is recorded in a plurality of AND circuits 231–0 through 231–7 which are selectively connected to the ON and OFF outputs of the triggers TE, TF and TG so as to record the count. Since the total black count in any time zone is what is utilized, it will be realized that misalignment of the characters at the read heads 16 will not affect the result as the total will be unaffected.

A sample of the black counter output is taken by connecting the outputs of the AND circuits 231–0 through 231–7 through amplifiers 233–0 through 233–7 and lines such as the lines 234, 235, and 236, to a plurality of AND circuits 238 comprising the counter sampling network 38. In the AND circuits 238, which include, for example, 238–A0 through 238–G7, the outputs from the black counter are gated with each of the outputs from the recognition counter clock amplifiers 204A–204G to register, for example, a count ranging from zero at A time to F time, up to a count of 7 during A time through G time. The outputs of these AND circuits are selectively connected to a plurality of OR circuits 42–0 through 42–SS4 comprising truth statements concerning scanned characters. The inputs of these OR circuits are selected on the basis of truth tables shown in FIG. 8, which are based on the results of field tests, so that when predetermined black counts occur at particular scan times, selected ones of the character register latches 44–0 through 44–SS4 will be turned off, leaving eventually only a single one of the character registers 44–0 to 44–SS4 turned on, indicating this to be the character scanned.

For example, the inputs to OR 42–0 will be A0, A1, A2, A3, B0, B5, B6, B7, C0, C5, C6, C7, D0, D5, D6, D7, E0, E5, E6, E7, F0, G2 and G3, as these values of black count at the indicated time intervals or zones have shown from field experience that they will not occur for a 0. Hence, the 0 character register latch 44–0 should be turned off by an output from OR 42–0 upon the occurrence of any one of these values.

In operation, detection of a document by the sensing device 15 removes the reset signal applied to the black counter ring 34 over line 215 (FIG. 5*c*) from inverter 216 and enables the black counter to be free-running. Because the recognition clock control latch 219 was turned off at the end of the previous cycle by a signal from AND circuit 220, the ON output will be plus, and this is applied to the set terminal of the black counter latch 41 over line 241 to turn the black counter latch on. The ON output of the black counter latch 41 will then be negative and this is applied to the AND circuit 39 in conjunction with the output from the oscillator 37 to start the black counter ring 34 running. The ON terminals 142′ of the digital triggers DT1 through DT10, which are connected to the AND circuits 32A through 32J of network 32 (FIG. 5*d*), are scanned by pulses from the triggers TA through TD of ring 34 (FIG. 5*c*). For each black area scanned by a head 16 and output is registered at its respective trigger DT1, etc., and an output is produced by the OR circuit 33 to advance triggers TE through TG of the black counter 36. The count of the black counter 36 is registered in the AND circuits 231–0 through 231–7, which are selectively connected to different outputs of the triggers as shown, and when a black count of two is registered at AND 231–2, it is applied over conductor 235 to turn on timing control latch 43.

The OFF output of the timing control latch 43′ turns on the recognition clock control latch 219, which applies a signal over conductor 239 to the oscillator 35 and start the recognition clock 40 running. The black counter latch 41 is reset by an output from AND 32–11 at the end of the scan, over line 221. The black counter 36 is reset by the output from AND 32–12 at the beginning of the next cycle. The ON output of the M trigger is used in AND 208 to set the character registers 44–0 through 44–SS4 on over line 208′. The ON output of the 0 trigger and the OFF output of the P trigger combine in AND circuit 205 to produce a run-one-cycle signal (curve XIII of FIG. 7) over conductor 207 to turn the black counter latch 41 ON and keep the black counter ring 34 running for a single cycle. The digital triggers DT1 through DT10 are scanned by gating their outputs at terminals 142′ in AND circuits 32A through 32J with selected outputs from triggers TA through TD of counter ring 34. The outputs of the AND circuits 32A through 32J are mixed in OR 33, and the outputs thereof are gated in AND 29 with the output of AND 231–7 as an inhibit to prevent a count of greater than 7, and pulses from oscillator 37 over line 249. Black counter 36 is advanced by the AND 29 to produce a count in select ones of AND circuits 231–0 through 231–7 representative of the black count in the time interval or zone G.

The outputs of amplifiers 233–0 through 233–7 are mixed in AND circuits 238–A0 through 238–G7 with the G pulse (curve XIV of FIGS. 6 and 7), and selected outputs are directed to the logic truth statement OR circuits 42–0 through 42–SS4 in accordance with the tables shown in FIG. 8. Selected ones of the latches 44–0 through 44–SS4 will be turned OFF if an input occurs to their associated OR circuit during G scan time.

At the end of G scan time the black counter control latch 41 is reset by an output from AND 32–11 over line 221 to stop the counter ring 34. The black counter 36 is reset at the beginning of the next scan by the output of AND 32–12.

A run-one-cycle signal is generated at AND 205 to again turn the black counter latch 41 on and start a second scan during F time. The counter ring 34 (curves XVIII–XXI of FIG. 6) again sample the AND circuits 32 and the black counter 36 is advanced to register the black count for F time, and through AND circuits 238 and OR circuits 42 turn off still others of latches 44–0 through 44–SS4.

As the recognition timing ring 40 advances, pulses G, F, E, D, C, B, A are produced in sequence and the scan of the digital triggers DT1 through DT10 is made for each timing pulse to record the black count through black sample counter 36 and apply the results thereof through the AND circuits 231–0 through 231–7 to the character sampling network AND circuits 238 which selectively energize the different ones of truth statements 42–0 through 42–SS4. For example, the SS4 or dash symbol latch, 44–SS4, will be turned off by the truth statement 42–SS4 as shown in the tables in FIG. 8 for any one of the following counts: G5, G6, G7, F3, F4, F5, F6, F7, E1, E7, E6, E5, E0, D7, D6, D5, D1, D0, C7, C6, C5, C4, C3, C2, B7, B6, B5, B1, B0 and A7.

The above-description and the accompanying drawings will be apparent that the present invention provides in a simple and effective manner for determining the nature of the character by initially turning on all of the plurality of character recognition latches and turning different ones of them off based on a summation and time relationships in a plurality of different time zones during the scan. Since the statements are based on examination of actual field-gathered data, the logic representations may be readily modified as later data becomes available. Since we are working in the direction of selecting a particular character, the uniqueness of the black count of the different characters in successive time zones assists indicating the probability of the character being a predetermined one. Utilizing the invention, characteristics of each zone for each character can be grouped into low and high probability groups. Only those showing high probability in all zones can comply, so this increases the probability of the character being accurately determined. Since in accordance with the system, we are recognizing the character by eliminating improbable characters even from the first zone, a narrower indication of the character being a particular one is arrived at successively as the different zones are scanned, so that a final decision may be reached before all the information is read. All of the information isn't necessary to make the decision, but the information in the remaining time zones assists in verifying that the decision was proper. A system built according to the invention lends itself to editing in order to make up for printing deficiencies in the vertical direction and is flexible in that it can be modified for different type fonts.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Character recognition apparatus comprising,
(a) a multichannel means including sensing means for scanning a character and storage means connected for producing signal data representative of black portions of scanned character increments,
(b) means connected to the storage means for counting black scanned character increment portions,
(c) timing means connected for advancing signal data from the storage means to operate the counting means at each of a plurality of predetermined timed intervals during the scan of each character,
(d) a plurality of character recognition circuits each individual to a character,
(e) means for activating said circuits, and
(f) a plurality of truth statement logic circuits coupled to the counting means and the recognition circuits for selectively deactivating predetermined ones of said circuits in successive ones of each of said timed intervals during the scan of a single character in accordance with the black portion character increments counted in each interval.

2. Character recognition apparatus comprising,
(a) multichannel sensing means for scanning a character and storage means connected therewith for producing signal data representative of the instantaneous number of black portions being scanned,
(b) means for counting the number of black portions,
(c) timing means controlled by the counter connected to the storage means and counting means for advancing signal data from the storage means to the counting means at each of a plurality of predetermined timed intervals during the scan of a single character,
(d) a plurality of character recognition circuits each individual to a character,
(e) means for activating said circuits at the beginning of a character scan, and
(f) means including a plurality of logic truth statements selectively coupling the counting means and the character recognition circuits during each timed interval for successively deactivating different ones of the recognition circuits in each of said intervals in accordance with the number of black character increment portions counted.

3. Character recognition apparatus comprising,
(a) multichannel sensing means for scanning characters in sequence and producing signal data representative of black character increments scanned,
(b) storage means connected to the sensing means for storing said data signals,
(c) counter means connected to the storage means for counting the number of black character increments in each of a plurality of timed intervals across each character,
(d) a plurality of character recognition devices each individual to a character,
(e) means for turning all of the recognition devices on at the beginning of a character scan including timing means controlled by the counter means for resetting the storage means at each of said plurality of predetermined timed intervals during the scan of each character, and
(f) circuit means including a plurality of truth statements logic circuits connecting the counter means and the recognition devices for selectively turning off different ones of the devices in successive timing periods during the scan of each character.

4. Character recognition apparatus comprising,
(a) multichannel sensing means for scanning characters in sequence and producing signal data representative of black character increments being scanned,
(b) storage means connected to the sensing means for storing said data signals,
(c) counter means coupled to the storage means for counting the number of black character increments in each of a plurality of timed intervals during the scan of each character,
(d) a plurality of character recognition latches each representing a different character,
(e) timing means controlled by the counter means for turning all of the latches on at the beginning of a character scan, said timing means being connected to the storage means to produce pulses at each of a plurality of predetermined timed intervals during each scan of each character to reset the storage means, and
(f) circuit means including a plurality of logic truth statement ci rcuits connecting the counter means and the timing means to the character recognition latches for resetting different ones thereof in each timed interval in accordance with the count of black increments for said interval.

5. Character recognition apparatus comprising, (a) multichannel sensing means for serially scanning a plurality of characters and producing signal data representative of black character increments scanned, (b) means connected to the sensing means for storing said signal data, (c) counter means coupled to said storage means for counting the number of black character increment signals registered therein, (d) timing means controlled by the counter means for resetting said storage means each of a plurality of timed intervals during each character scan, (e) a plurality of character recognition devices, (f) means for setting said devices under the control of said timing means, and (g) circuit means coupled to the counter means and the timing means including a plurality of logic truth statments connected in accordance with an analysis of a plurality of different printed characters for selectively turning off different ones of the devices in each timed interval in accordance with the number of black character increment signals counted during said interval.

6. Character recognition apparatus comprising, (a) multichannel sensing means for serially scanning a plurality of characters and storage means connected thereto for producing signal data representative of the number of black areas in each of a plurality of increments of the character scanned, (b) means connected to the storage means for producing a count in accordance with the instantaneous number of black areas, (c) circuit means including timing means controlled by the counting means and connected for producing a plurality of timed pulses to operate the counting means to produce a black count at each of a plurality of predetermined spaced intervals during the scan of each character, (d) a plurality of character recognition devices each representative of a particular character, (e) means for turning all of said devices on at the beginning of a scan, and (f) a plurality of logic AND truth statement circuits connecting the counting means, timing means and recognition devices for selectively turning off different ones of the devices in succession in accordance with probability results based on examination of actual field data for a given black count in a particular time interval.

7. Character recognition apparatus comprising, (a) multichannel sensing means for serially scanning a plurality of character and producing signal data representative of black scanned character increments, (b) storage means including a plurality of storage devices connected to the sensing means for storing said signal data, (c) a black increment counter, (d) black increment timing means coupled to the storage means for operating the black increment counter to determine the number of black character increments in said storage means, (e) a character recognition register including a plurality of latches corresponding to characters to be recognized, (f) recognition timing means controlled by the black increment counter to turn all the latches on, for producing timed impulse signals at each of a plurality of predetermined timed intervals in each character scan to cause the black increment timing means to make a single scan of the storage means, and for resetting the storage means at the end of said scan in each interval, and (g) a plurality of logic truth statements logic circuits coupling the black increment counter and the character recognition latches for selectively turning successive ones of said latches off in each time interval in accordance with the number of black character increments counted in said interval.

8. Character recognition apparatus comprising, (a) multichannel sensing means for simultaneously scanning a plurality of paths across a character and producing individual signal data representative of black portions of scanned increments of the character, (b) storage means connected to said sensing means including a plurality of storage devices for storing said signal data, (c) a plurality of character recognition latches one for each type of character to be recognized, (d) a black increment counter, (e) black increment timing means coupled to the storage means and the counter for advancing the black increment counter to determine the number of black character increment signals in said storage means, (f) recognition timing means operable under the control of the black increment counter connected to said latches, counter and storage means for turning the latches on and producing timing signals at each of a plurality of predetermined spaced intervals during the scan of a character to read out the counter and reset the storage means at the end of each interval, and (g) a plurality of logic circuits coupling the black increment counter and the character recognition latches for selectively turning different ones of the latches off in accordance with probability results of different black counts in each of the timed intervals.

9. Character recognition apparatus comprising, (a) sensing means for serially scanning a plurality of characters and producing signal data representative of black portions of a character being scanned, (b) storage means for storing said signal data, (c) means for selectively connecting the storage means to the sensing means to store an indication of a portion of a character scanned, (d) a counter coupled to the storage means for registering a count of black portions of a character scanned, (e) timing means operable under the control of the counter to produce a plurality predetermined spaced impulse signals during the scan of a character for resetting the storage means at the end of each interval, (f) a plurality of character recognition latches each representative of a particular character, and (g) a plurality of truth statement logic circuits connecting the counter to select ones of the latches in each time interval for selectively turning off successive ones of the latches in each interval in accordance with the probability results from the examination of the number of black portions in each timed interval of characters in actual field tests.

10. Character recognition apparatus comprising, (a) sensing means for scanning a character and storage means connected thereto for producing signal data representative of the number of black portions in a scanned character increment, (b) means connected to the storage means for counting the number of black portions, (c) timing means controlled by the counting means for advancing signal data from the storage means to operate the counting means during each of a plurality of predetermined timed intervals in the scan of a character, (d) a plurality of character recognition devices connected to be activated by the timing means at the beginning of a scan, and (e) means including a plurality of logic truth statement circuits connecting the timing means, counting means and character recognition devices for selectively turning off successive ones of the devices in each of said intervals based on the probability of a particular black count in each of said plurality of particular timed intervals excluding possibility of the character being the one whose device is turned off.

References Cited by the Examiner

UNITED STATES PATENTS 2,932,006 4/1960 Glauberman -------- 340—146.3

MAYNARD R. WILBUR, *Primary Examiner.*

MALCOLM A. MORRISON, *Examiner.*

J. S. IANDIORIO, J. SMITH, *Assistant Examiners.*